United States Patent
Koishi

(10) Patent No.: US 7,137,029 B2
(45) Date of Patent: Nov. 14, 2006

(54) INFORMATION PROCESSOR

(75) Inventor: Takahiro Koishi, Tokyo (JP)

(73) Assignee: NEC Corporation, Tokyo (JP)

( * ) Notice: Subject to any disclaimer, the term of this patent is extended or adjusted under 35 U.S.C. 154(b) by 654 days.

(21) Appl. No.: 10/625,565

(22) Filed: Jul. 24, 2003

(65) Prior Publication Data

US 2004/0153584 A1 Aug. 5, 2004

(30) Foreign Application Priority Data

Jul. 30, 2002 (JP) .............................. 2002-221159

(51) Int. Cl.
*G06F 11/00* (2006.01)

(52) U.S. Cl. .......................................... 714/11; 714/13
(58) Field of Classification Search ................... 714/11, 714/12, 13
See application file for complete search history.

(56) References Cited

U.S. PATENT DOCUMENTS

| | | | |
|---|---|---|---|
| 5,748,873 A * | 5/1998 | Ohguro et al. ................. | 714/11 |
| 6,202,170 B1 * | 3/2001 | Busschbach et al. .......... | 714/11 |
| 6,708,287 B1 * | 3/2004 | Mitsuhashi et al. ........... | 714/15 |
| 6,850,807 B1 * | 2/2005 | Tahira ........................... | 700/79 |
| 2006/0088121 A1 * | 4/2006 | Feher ........................... | 375/271 |

FOREIGN PATENT DOCUMENTS

| | | |
|---|---|---|
| DE | 198 14 096 A1 | 3/1998 |
| JP | 02-094748 | 4/1990 |
| JP | 04-324535 | 11/1992 |
| JP | 06-222944 | 8/1994 |
| JP | 10-187473 | 7/1998 |

\* cited by examiner

*Primary Examiner*—Dieu-Minh Le
(74) *Attorney, Agent, or Firm*—Foley & Lardner LLP

(57) ABSTRACT

An information processor is provided with: two chip sets that are each provided with a serial controller, these chip sets being the interface between a CPU and an input/output device; a selector for switching the connection routes between the serial controllers and the input/output device when a fault occurs in one of the chip sets; and a service processor for causing output data of the serial controller of the working chip set to be supplied to the output device and data from the input device to be supplied to each of the two serial controllers when a fault has not occurred in the chip sets, and when a fault occurs in either one of the chip sets, causing only the output data of the serial controller of the normal system to be supplied as output to the output device and data from the input device to be supplied to only the serial controller of the normal system.

7 Claims, 2 Drawing Sheets

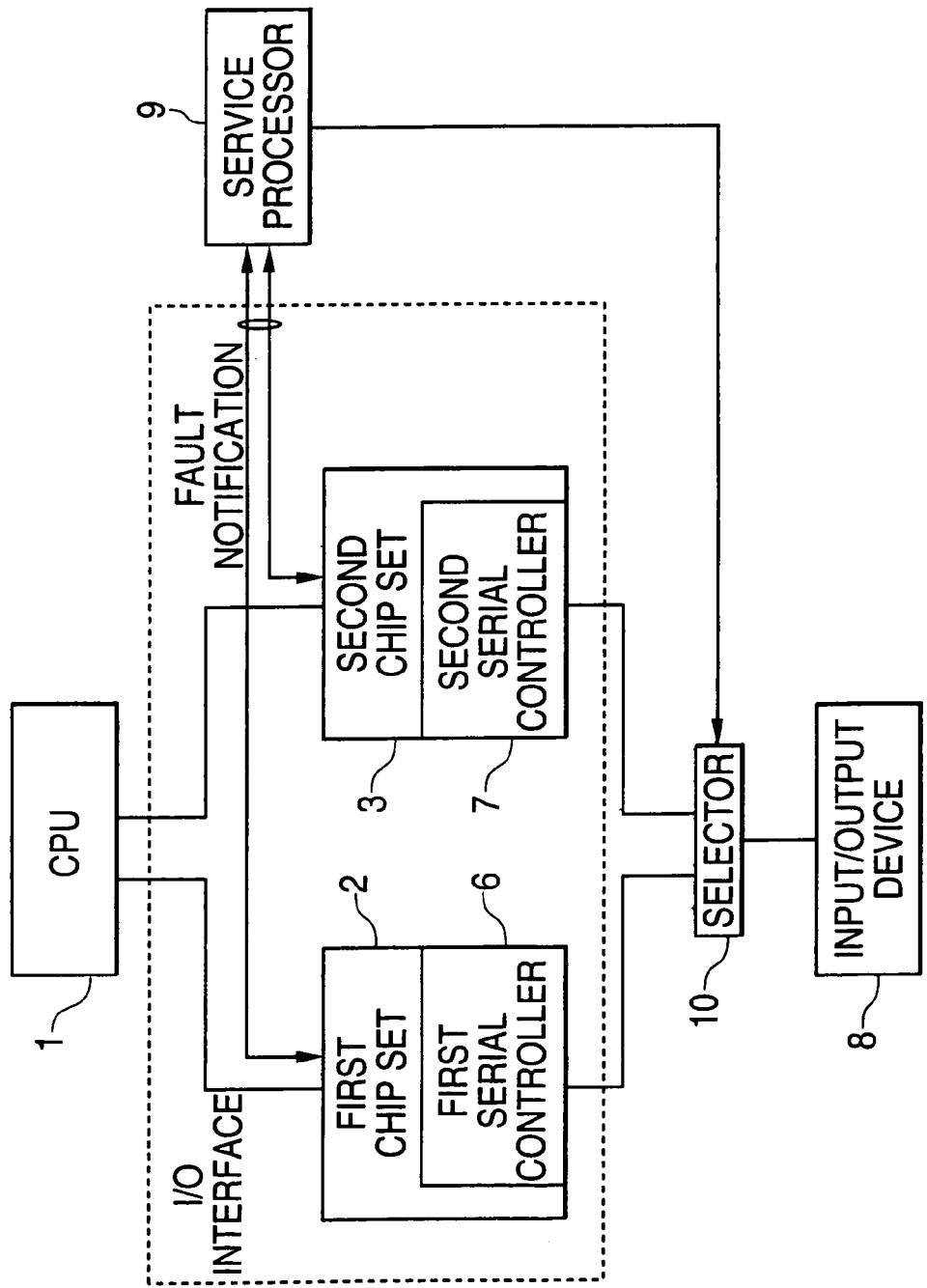

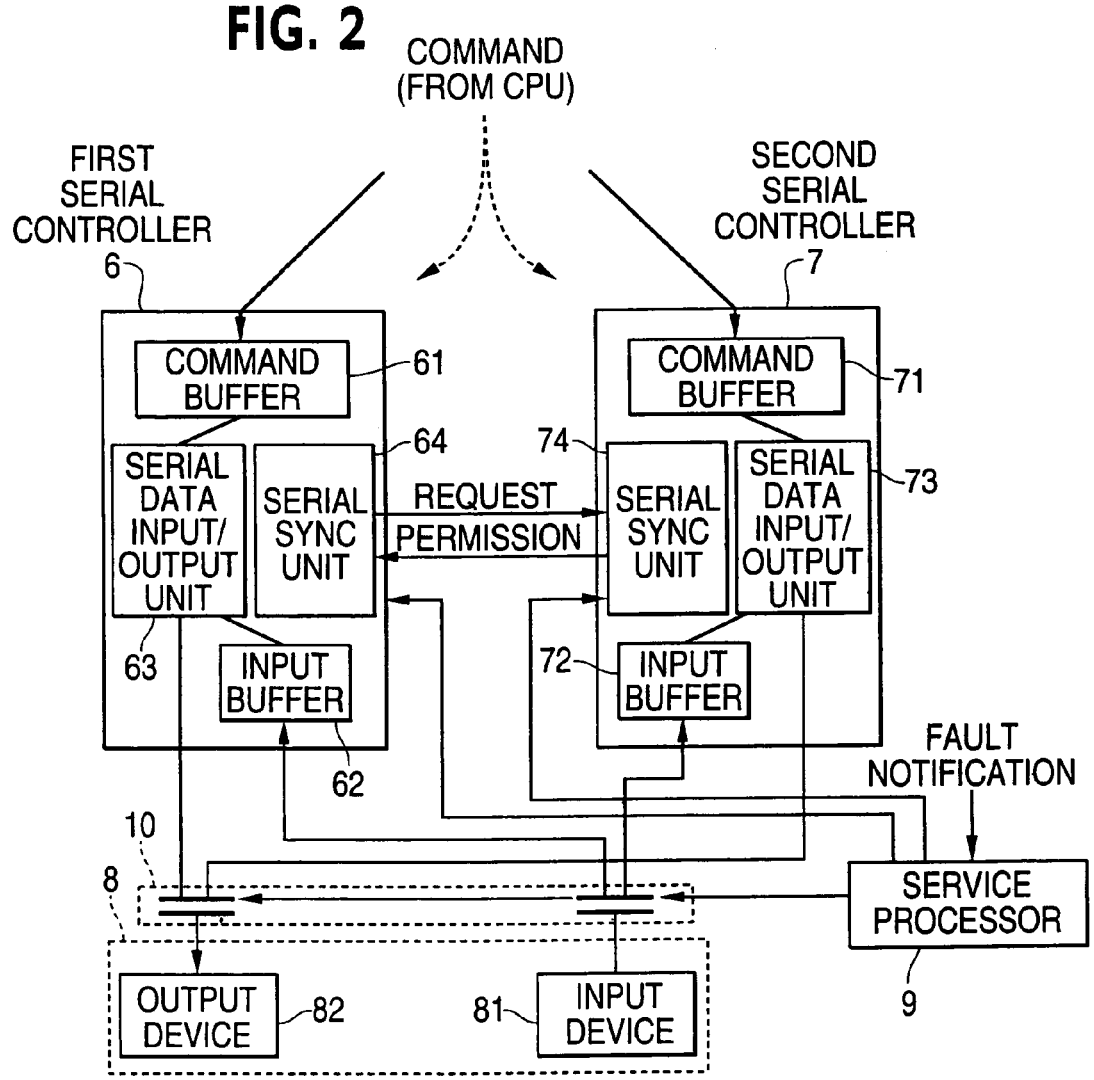

INFORMATION PROCESSOR

BACKGROUND OF THE INVENTION

1. Field of the Invention

The present invention relates to an information processor, and more particularly to an information processor that is provided with a serial controller for controlling serial data transfer.

2. Description of the Related Art

As a countermeasure against faults, information processors often feature a construction that is provided with a fault analysis means or reserve devices in addition to normally required devices. For example, an improvement in the reliability as an information processor can be obtained by providing a duplex structure for the CPU, memory unit, or memory controller for controlling data transfer between the CPU and memory unit and then switching to the reserve standby system in the event of a fault in the working system that is used in normal operation.

As another example of an information processor having greater reliability, one known construction is provided with a service processor for collecting information such as fault detection information or log-out data at the time that a fault occurs and then analyzing the site of the fault.

Of the information processors of this type in the prior art, constructions in which the operation of the CPU is controlled by a serial console are still prone to the problem that, if the serial console is included at the point of incidence of a fault, messages or data that are issued from that serial console may be lost despite the duplex configuration of the CPU or memory unit.

In addition, if a fault occurs at a serial controller that is provided in a serial console, this serial controller being the I/O interface between the CPU and input/output device, this fault may constitute an SPoF (Single Point of Failure) and may halt the operation of the entire information processor.

SUMMARY OF THE INVENTION

It is an object of the present invention to provide an information processor that is provided with a serial controller that can both prevent the loss of messages or data that are supplied to the CPU and eliminate the occurrence of SPoF.

To realize the above-described object, the information processor of the present invention is a construction provided with: a CPU; an input/output device that is in turn provided with an input device for applying data or commands as input to the CPU and an output device for supplying commands and the results of processing that are issued from the CPU; two chip sets that are each provided with a serial controller, these chip sets being the I/O interface that is interposed between the CPU and the input/output device; a selector for switching the connection routes of the serial controllers and input/output device when a fault occurs in one of the two chip sets; and a service processor for controlling the selector to cause the output data of the serial controller of the working system to be supplied to the output device and data from the input device to be supplied to each of the two serial controllers when no fault has occurred in the chip sets, and upon receiving notification of the occurrence of a fault from either one of the chip sets, to cause only the output data of the serial controller that is provided in the chip set that is operating normally to be supplied as output to the output device and to cause data from the input device to be supplied only to the serial controller that is provided in the chip set that is operating normally.

In this construction, commands and the results of data processing that are issued from the CPU, and input data that are received as input by way of the input/output device, are supplied to both serial controllers when no fault has occurred. An information processor can therefore be maintained and operated without any loss of messages or data that are transmitted from the input/output device or CPU even when a chip set in which a fault has occurred is cut off. In addition, operation can be maintained without halting the system even when the site of the fault is the serial controller itself.

An information processor can thus be provided that is provided with a serial controller that is capable of both preventing loss of messages or data and eliminating the occurrence of SPoF.

The above and other objects, features, and advantages of the present invention will become apparent from the following description with reference to the accompanying drawings, which illustrate examples of the present invention.

BRIEF DESCRIPTION OF THE DRAWINGS

FIG. 1 is a block diagram showing an example of the construction of an information processor of the present invention; and FIG. 2 is a block diagram showing the construction of the serial controller shown in FIG. 1.

DETAILED DESCRIPTION OF THE PREFERRED EMBODIMENTS

The information processor of the present invention is a construction with a duplex serial controller configuration, and is therefore a construction that can realize continuous operation when a fault occurs in the working serial controller by using the serial controller that is in standby.

We first refer to FIG. 1, which is a block diagram showing an example of the construction of the information processor of the present invention. In addition, FIG. 2 is a block diagram showing the construction of the serial controller shown in FIG. 1. The information processor that is shown in FIG. 1 is a computer system provided with serial controllers. FIG. 1 shows an example of a construction in which the routes between the CPU and the input/output device are of a duplex configuration.

As shown in FIG. 1, the information processor of the present invention is a construction that includes: CPU 1; input/output device 8 which is in turn provided with an input device for applying data and commands as input to CPU 1 and an output device for supplying the commands and data that are the processing results that are issued from CPU 1 as output; first chip set 2 is provided with first serial controller 6, and second chip set 3 is provided with second serial controller 7, these two chip sets being the I/O interface that is interposed between CPU 1 and input/output device 8; selector 10 for switching the routes connecting the serial controllers 6 and 7 and input/output device 8 when a fault occurs in either one of first chip set 2 and second chip set 3; and service processor 9 for controlling the operation of first chip set 2, second chip set 3, and selector 10. First chip set 2 and second chip set 3 together constitute a serial console.

In the information processor of the present embodiment, the I/O interface for interconnecting CPU 1 and input/output device 8 is a duplex construction realized by first chip set 2 and second chip set 3; and in this example, first chip set 2 is employed as the working system that is used in normal operation, and second chip set 3 is used as the reserve standby system. Nevertheless, no distinction exists between the working system and the standby system when no fault has occurred.

In addition, service processor 9 for performing fault analysis is connected to first chip set 2 and second chip set 3, fault occurrence information being reported (fault notification) from first chip set 2 and second chip set 3 to service processor 9. When fault occurrence information is reported, service processor 9 both effects control over selector 10 to cut off the chip set in which the fault has occurred and halts the synchronizing process that is realized by first serial controller 6 and second serial controller 7, this process being explained in greater detail below.

In a construction of this type, the output data of either one of first chip set 2 or second chip set 3 (in this case, first chip set 2, which is the working system) are supplied to input/output device 8 by way of selector 10 as long as a fault does not occur in the information processor that is shown in FIG. 1. In addition, input data that are received from the outside as input using input/output device 8 are supplied by selector 10 to each of first chip set 2 and second chip set 3. CPU 1 supplies as output the same commands and the same data processing results to first chip set 2 and second chip set 3.

When a fault occurs in either one of first chip set 2 and second chip set 3, notification of this fault is transmitted to service processor 9. Service processor 9 cuts off the chip set in which the fault occurred from the system, and connects CPU 1 and input/output device 8 by only the normal system.

Accordingly, in the information processor of the present embodiment, commands and the results of data processing from CPU 1 or input data from input/output device 8 are supplied to both first serial controller 6 and second serial controller 7 when a fault does not occur, and thus, when a fault does occur, the information processor can be maintained and operated without any loss of the messages and data that are sent from input/output device 8 and CPU 1 even though the chip set in which the fault occurred is cut off.

FIG. 1 shows the construction of an information processor having only CPU 1, input/output device 8, I/O interface (first chip set 2 and second chip set 3), and service processor 9, but an actual information processor may be further provided with, for example: memory for storing data; a memory controller for controlling the reading of data from and the writing of data to the memory; and a system controller for realizing interruption control, DMA control, a system clock, a timer, and power management.

As shown in FIG. 2, first serial controller 6 is a construction that includes: command buffer 61 for temporarily holding commands that are sent from CPU 1; input buffer 62 for temporarily holding input data from input device 81 that forms a part of input/output device 8; serial data input/output unit 63 for transmitting serial data between CPU 1 and input/output device 8; and serial synchronizing unit 64 for synchronizing internal operations with second serial controller 7. Similarly, second serial controller 7 is a construction that includes: command buffer 71 for temporarily holding commands that are sent from CPU 1; input buffer 72 for temporarily holding input data from input device 81 that forms a part of input/output device 8; serial data input/output unit 73 for transmitting serial data between CPU 1 and input/output device 8; and serial synchronizing unit 74 for synchronizing internal operations with first serial controller 6.

Command buffers 61 and 71 and input buffers 62 and 72 are each made up from, for example, shift registers; and serial synchronizing units 64 and 74 and serial data input/output units 63 and 73 are each made up from, for example, logic circuits in which a variety of logic gates are combined.

When no fault has occurred, the output data from either serial data input/output unit 63 or 73 are selected as the output data of the working system by selector 10 under the control of service processor 9 and transmitted to output device 82. Input data or messages from input device 81 are supplied as input to each of input buffers 62 and 72 by way of selector 10 under the control of service processor 9.

Commands (or output data) that are issued from CPU 1 are each held by command buffers 61 and 71. Because the information processor of this embodiment adopts a duplex chip set configuration, commands that are issued from CPU 1 are supplied to both first serial controller 6 and second serial controller 7.

When a command is stored in command buffer 61, serial synchronizing unit 64 of the working system (in this case, first serial controller 6) uses lines that are dedicated for synchronization to request serial synchronizing unit 74 of the standby system (in this case, second serial controller 7) for permission to execute the command that has been issued from CPU 1.

Serial synchronizing unit 74 of the standby system, having received the request for permission to execute the command from serial synchronizing unit 64 of the working system, first checks whether or not a command that has been issued from CPU 1 is stored in command buffer 71 of its own system, and if both the command and the request for permission to execute are present, transmits permission to execute to serial synchronizing unit 64 of the working system and causes serial data input/output unit 73 to execute processing in accordance with the command that has been issued from CPU 1.

If a command issued from CPU 1 is not stored in command buffer 71 (if either a request for permission to execute or the command are not present), serial synchronizing unit 74 waits for a command that is issued from CPU 1 to be stored in command buffer 71 and then sends permission to execute to serial synchronizing unit 64 of the working system and causes serial data input/output unit 73 to execute processing in accordance with the command that has been issued from CPU 1.

When input data (or messages) from input device 81 are stored in input buffer 62, on the other hand, serial synchronizing unit 64 of the working system (in this case, first serial controller 6) requests serial synchronizing unit 74 of the standby system (in this case, second serial controller 7) for permission to accept input data that have been supplied from input device 81.

Serial synchronizing unit 74 of the standby system, having received from serial synchronizing unit 64 of the working system the request for permission to accept input data, first checks whether or not input data that have been supplied from input device 81 are stored in input buffer 72 of its own system, and if the request for permission to accept and the input data are both present, both sends permission to accept to serial synchronizing unit 64 of the working system and causes serial data input/output unit 73 to execute processing to accept input data that have been supplied from input device 81.

If input data that have been supplied from input device 81 are not stored in input buffer 72 (if either a request for permission to accept or the input data are not present), serial synchronizing unit 74 waits for input data that have been supplied from input device 81 to be stored in input buffer 72, and then sends permission to accept to serial synchronizing unit 64 of the working system and causes serial data input/ output unit 73 to execute processing to accept the input data that have been supplied from input device 81.

In this way, the processing of commands from CPU 1 and the acceptance of input data from input device 81 are both executed with the two serial controllers 6 and 7 in synchronization with each other, and the internal states of serial data input/output unit 63 of the working system and serial data input/output unit 73 of the standby system are thus always kept in concurrence.

If a fault occurs during operation in first chip set 2 or second chip set 3, service processor 9, having received notification of the fault, cuts off from the system the entire chip set that includes the serial controller of the system in which the fault occurred and continues operations using only the system in which a fault has not occurred.

At this time, service processor 9 controls selector 10 such that output data of the serial controller of the system that continues operation are supplied as output to output device 82 and input data from input device 81 are supplied to the serial controller of the system that continues operation. Service processor 9 also halts the synchronization process that is realized by the exchange of the above-described messages between serial synchronizing units 64 and 74.

Accordingly, the information processor of the present invention is capable of continuing operation without any loss of input data or messages from input device 8 or CPU 1 despite the occurrence of a fault in a system that includes a serial controller. In addition, operation can be continued without halting the system even if the point of failure is within a serial controller itself. The present invention can therefore provide an information processor that is provided with a serial controller that is capable of both preventing the loss of messages or data and eliminating the occurrence of SPoF.

While a preferred embodiment of the present invention has been described using specific terms, such description is for illustrative purposes only, and it is to be understood that changes and variations may be made without departing from the spirit or scope of the following claims.

What is claimed is:

1. An information processor, comprising:
  a CPU;
  an input/output device that is provided with an input device for applying data or commands as input to said CPU and an output device for supplying as output commands or the results of data processing that are issued from said CPU;
  two chip sets that are each provided with a serial controller, said chip sets operating as a working system that normally operates or a reserve standby system, said chip sets being an I/O interface that is interposed between said CPU and said input/output device;
  a selector for switching the connection routes of said serial controllers and said input/output device when a fault occurs in one of said two chip sets; and
  a service processor for controlling said selector to cause the output data of said serial controller of said working system to be supplied to said output device and data from said input device to be supplied to each of said two serial controllers when no fault has occurred in said chip sets, and upon receiving notification of the occurrence of a fault from either one of said chip sets, to cause only output data of the serial controller that is provided in the chip set that is operating normally to be supplied as output to said output device and to cause data from said input device to be supplied only to the serial controller that is provided in the chip set that is operating normally.

2. The information processor according to claim 1, wherein each of said serial controllers comprises:
  a command buffer for temporarily holding commands that are transmitted from said CPU;
  an input buffer for temporarily holding data that are received as input using said input device;
  a serial data input/output unit for transmitting data between said CPU and said input/output device; and
  a serial synchronizing unit for synchronizing the operations of the two serial controllers.

3. The information processor according to claim 2, wherein:
  when a fault has not occurred in said chip sets, and moreover, when a command from said CPU is stored in said command buffer, said serial synchronizing unit of said working system requests said serial synchronizing unit of said standby system for permission to execute said command; and
  said serial synchronizing unit of said standby system, upon receiving said request for permission to execute, and moreover, when said command is stored in said command buffer, both sends permission to execute said command to said serial synchronizing unit of said working system and causes said serial data input/output unit to execute processing of said command.

4. The information processor according to claim 2, wherein:
  when a fault has not occurred in said chip sets and when data from said input device have been stored in said input buffer, said serial synchronizing unit of said working system requests said serial synchronizing unit of said standby system for permission to accept said data; and
  said serial synchronizing unit of said standby system, upon receiving said request for permission to accept said data, and moreover, when data from said input device are stored in said input buffer; both sends permission to accept said data to said serial synchronizing unit of said working system and causes said serial data input/output unit to execute processing of accepting said data.

5. The information processor according to claim 2, wherein said service processor, upon receiving notification of the occurrence of a fault in either of said chip sets, halts the processing in said serial synchronizing unit for synchronizing the operations of said two serial controllers.

6. The information processor according to claim 3, wherein said service processor, upon receiving notification of the occurrence of a fault in either of said chip sets, halts the processing in said serial synchronizing unit for synchronizing the operations of said two serial controllers.

7. The information processor according to claim 4, wherein said service processor, upon receiving notification of the occurrence of a fault in either of said chip sets, halts the processing in said serial synchronizing unit for synchronizing the operations of said two serial controllers.

* * * * *